Sept. 29, 1942.  W. D. SWALLOW  2,297,084
ELECTRIC RECIPROCATING MOTOR
Filed Oct. 17, 1940   3 Sheets-Sheet 1
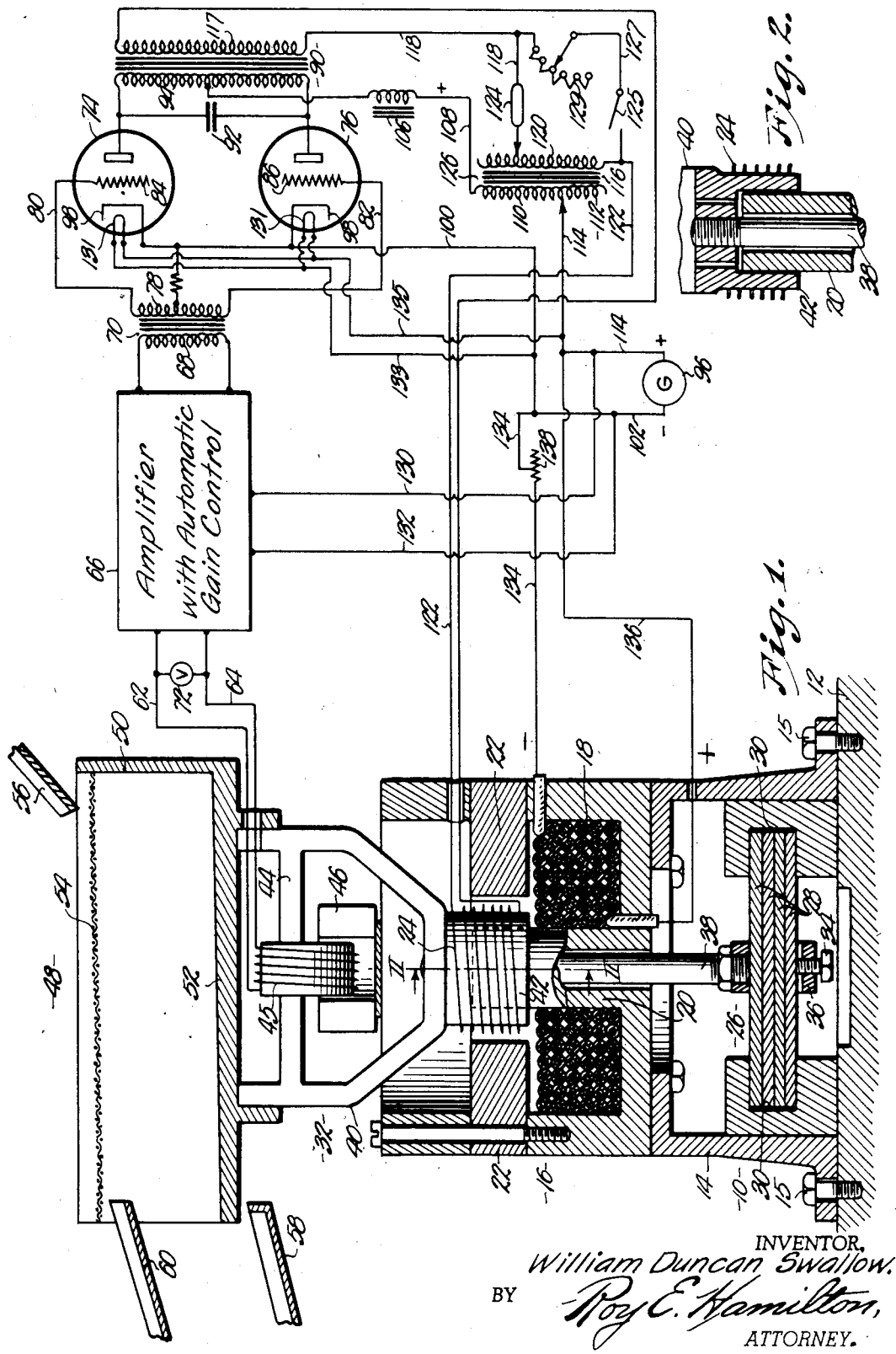
INVENTOR.
William Duncan Swallow.
BY Roy E. Hamilton,
ATTORNEY.

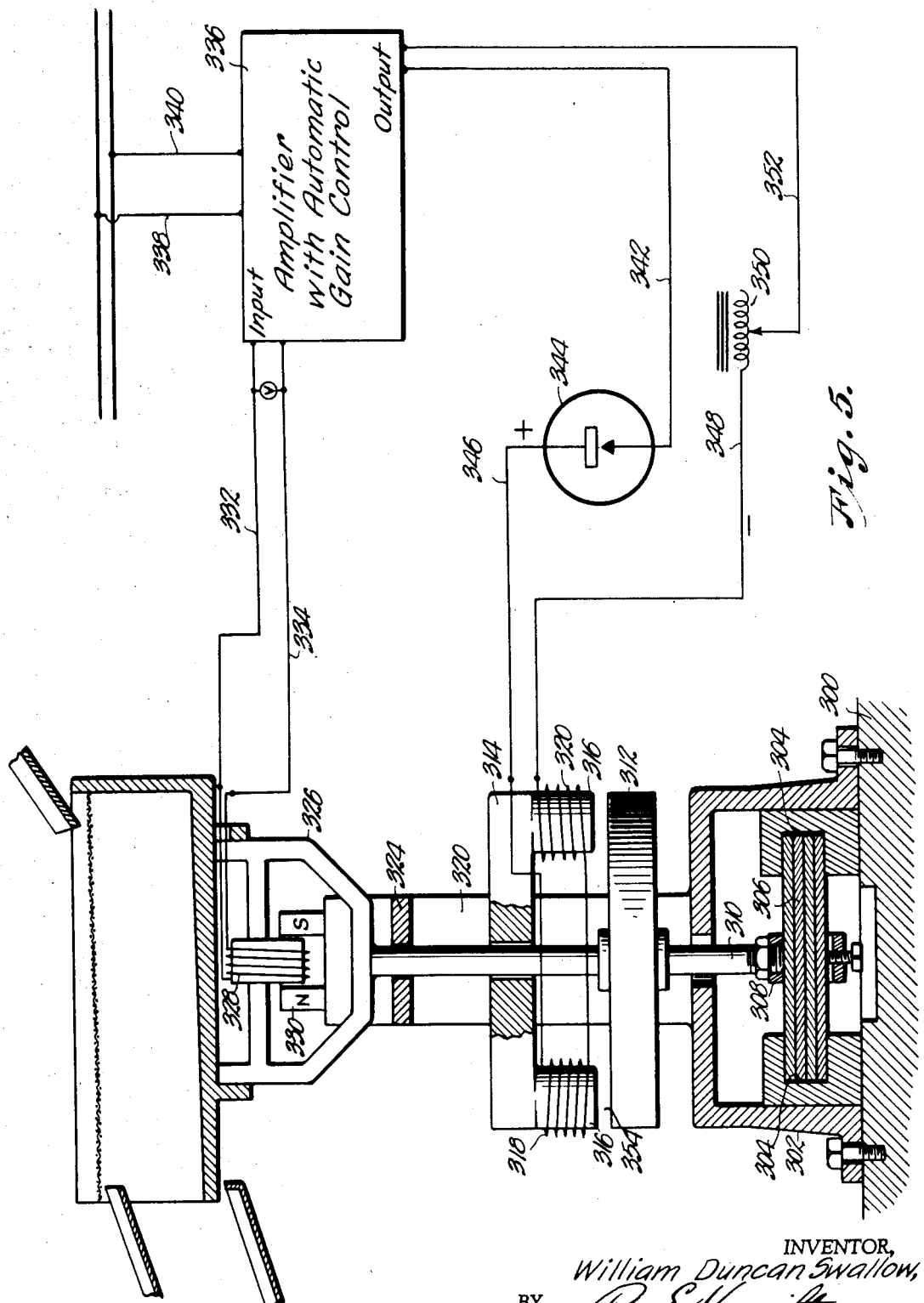

Patented Sept. 29, 1942

2,297,084

UNITED STATES PATENT OFFICE 2,297,084

ELECTRIC RECIPROCATING MOTOR

William Duncan Swallow, Kansas City, Mo., assignor of twenty-six and two-thirds per cent to George S. Pelton and Herbert E. Pelton, both of Los Angeles, Calif.

Application October 17, 1940, Serial No. 361,504

10 Claims. (Cl. 172—126)

This invention relates to improvements in electrical reciprocating motors and has for its principal object the production of an electric reciprocating motor having automatic means whereby the amplitude of vibration of the motor is maintained constant as the load varies.

In certain types of devices wherein a reciprocative movement is to be imparted to certain parts, and particularly to vibratory separating devices such as screens, etc. wherein the load varies it is important that the amplitude of reciprocation or vibration be maintained constant and that the frequency of the current of the driving electric reciprocating motor be maintained in step with the frequency of vibration of said certain parts of the device.

Another object of the present invention is the provision of an electric reciprocating motor wherein the mechanical load of the reciprocating armature of the motor varies and wherein electrical means is provided to automatically maintain a constant amplitude of reciprocation to the armature as said load varies.

A further object of the invention is the provision of an electric reciprocating motor having a reciprocal armature of variable mass adapted to be vibrated at relative high frequencies by a mechanical vibratory member and means within the motor circuit to automatically maintain the frequency of the electric current to the driving coil of the motor in synchronism with the vibratory frequency of the mechanical vibratory member.

Further objects of the invention will appear during the course of the specification referring to the drawings wherein:

Figure 1 is a diagrammatic view of an electric reciprocating motor, provided with a variable armature mass, embodying my invention.

Fig. 2 is a fragmentary sectional view taken on line II—II of Fig. 1.

Fig. 5 is a still further modified form shown diagrammatically.

Figure 3:
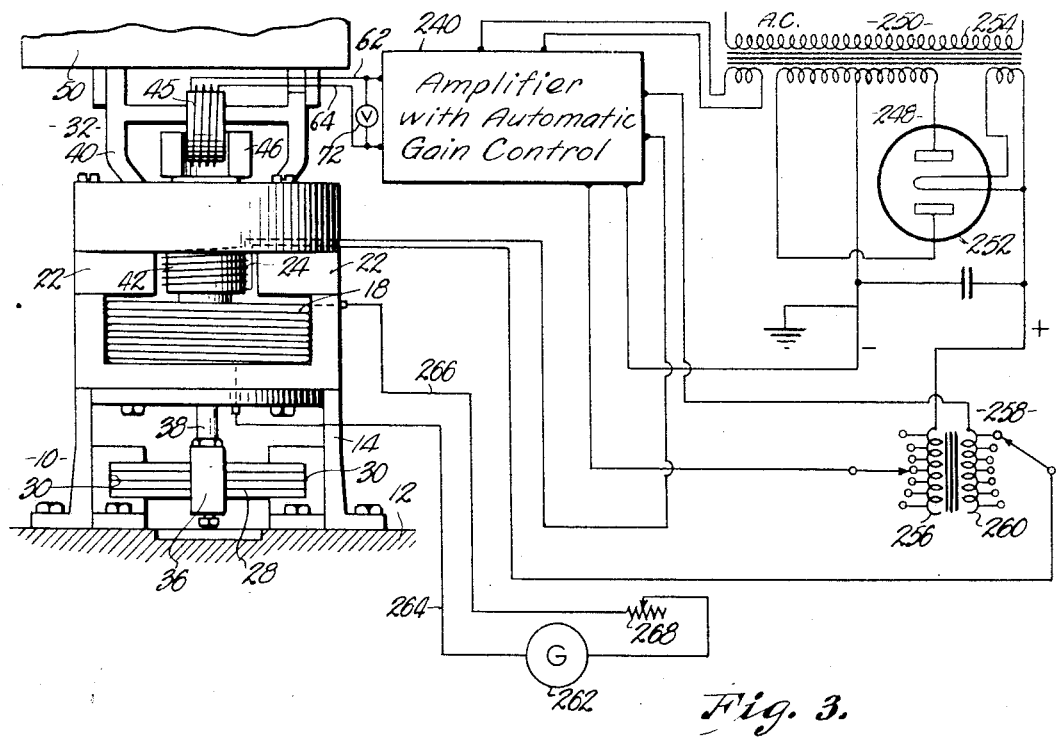
Fig. 3 is a modified form of the motor wherein is provided an audio frequency amplifier of sufficient power to meet the overload demands of the reciprocating armature.

In a device of this character it is convenient that a fixed supporting means 10 be provided to present rigid anchorage means for the vibratory parts. This supporting means 10 comprises a suitable base 12 to which is securely affixed a pedestal 14, by fastening means 15. Mounted on pedestal 14 is an electro-magnet 16 having the conventional coil 18 wound on the hollow core 20. Pole pieces 22 of the electro-magnet are spaced apart to receive the driving coil 24 which is mounted in a manner hereinafter described.

A vibratory element 26 comprising a series of superposed leaf springs 28 mounted at its extremities in grooves 30 in pedestal 14 is adapted to reciprocate at a pre-determined frequency. By changing the material, size or shape of element 26 the frequency of vibration may be varied to meet particular needs. The reciprocating portion or armature 32 of the motor comprises various parts securely interconnected to move as a single unit in unison with vibratory element 26 to which it is attached by means of set screw 34. Screw 34 is mounted in an eye member 36 through which the vibratory element passes. This eye is provided with an upwardly projecting stem 38 disposed at a substantially right angle to the vibratory element to extend through said hollow core 20 and having a yoke 40 of non-ferrous material secured at its upper end. The lower portion 42 of yoke 40 is hollow cylindrical shape to slidably engage the upper end of hollow core 20 as clearly shown in Fig. 2 and the upper portion thereof is provided with a cross bar 44 to which is secured the coil 45 of a generator having a stationary magnet 46 carried by the fixed supporting member.

Since an important use to which this electric reciprocating motor is to be put is to vibrate separators and classifying devices, etc., it is shown with a screening separator 48 attached. This separator has a body 50 with an included bottom 52 and a vertically spaced apart inclined screen 54. Material is delivered to the screen from a suitable supply by chute 56. The fines pass through screen 54 to bottom 52 and then to trough 58 and the coarse materials move along screen 54 and pass onto trough 60 where they move by gravity to the desired receptacle. The high frequency of vibration contemplated for this screening operation insures an extremely high capacity for a given size screen, furthermore a variation of load due to the uneven feed of material to the screen, and also the feeding of materials of different specific gravities, will not change the amplitude of vibration, because of the particular electric means provided to control the power supply current to the electro-magnet driving means. It is quite apparent that other types of separators or classifiers depending on a vibratory movement for their proper operation might be operated by this motor. The mechanical structure just described is substantially like that shown and described in my co-pending application, Serial No. 304,682.

Reference will now be had to the preferred form of electric reciprocating motor current control as shown in Fig. 1. The electric current generated as coil 45 moves in the magnet field of magnet 46 is fed by wires 62 and 64 to a standard audio frequency amplifier with automatic gain control 66 which delivers current to coil 68 of the grid coupling transformer 70. A volt meter 72 is positioned in multiple in the generator circuit to the amplifier.

Mercury-vapor triode tubes 74 and 76 of the positive grid control type are used to provide a local source of A. C. power which can be adjusted up to high frequencies. Other types of tubes with somewhat similar characteristics might be substituted for tubes 74 and 76 without departing from the spirit of the invention.

This automatic gain control not shown in detail is standard practice and is accomplished by feeding a proportion of the amplifier's output to a rectifier tube the D. C. output of which is impressed on the cathode of a control tube, varying the gain of the control stage. Input to the amplifier is the signal current generated in the generator coil 45, and the output current of the amplifier is fed to coil 68 of transformer 70. If the input signal current should weaken due to loss of amplitude of the vibrating armature 32 the automatic gain control will keep the output of the current at a constant level, thus insuring sufficient starting grid voltage for the grid controlled rectifier tubes 74 and 76. Since the current from transformer coil 78 through wires 80 and 82 respectively to the grids 84 and 86 is constant regardless of the current produced in the generator coil 45, it is possible to operate the armature at any desired amplitude. Transformer or plate output device 90 supplies alternating current to driving coil 24 at the same frequency as the input to amplifier 66.

Grid controlled rectifier tubes 74 and 76 operate as inverted converters on direct current with the plate commutation condenser 92 in multiple with the primary coil 94 storing sufficient energy for the commutation period.

The direct current intake source is from the generator 96 which is in circuit with the cathodes 98 of tubes 74 and 76 through wires 100 and 102. This direct current is converted to an alternating current, by the tubes, at the same frequency as the frequency of the current generated in the generator coil 54 by the movement of the armature 32 which is determined by the resonant point of the vibratory element 26. Therefore since this resultant alternating current is fed to the driving electric coil 24 which in turn is carried by the armature the current will always be in phase and synchronized with the reciprocating movement of the motor.

The following means for controlling the amplitude of reciprocation of the motor is one of several that might be used. Direct current input of center tapped coil 94 of transformer 90 passes from generator 96 through wire 114, coil 110 of reactor 112, wire 108, and choke coil 106. This coil 110 is tapped by wire 114 which connects with the direct current supply generator 96 so as to give the proper degree of saturation to the iron core 116 of the reactor. The choke coil 100 should have a value sufficient to keep down peak currents during the commutation period and to prevent double frequency generated by the tubes from getting into the D. C. line. Choke coil 100 might in some instances be eliminated since coil 110 could be adjusted to perform its functions.

The alternating current set up in coil 117 of transformer 90 passed by wire 118 to impedance coil 120 of reactor 112 and then to driving coil 24 over conductor 122. Line wire 118 is provided with a switch 124 and is adjustable along coil 120 to give desired impedance to the alternating power current. By proper adjustment of the tapped coils 110 and 120 the amplitude of reciprocation of the motor may be maintained at the desired predetermined level. By changing the effective length of these coils the amplitude of vibration may be varied, however when once set the device will operate to maintain a substantially constant amplitude.

Considering that the reactor was set with no load on the motor vibratory member, and that during its operation the load increases, there will be a decrease in the impedance in the power circuit to the driving coil 24 due to the dropping off of back E. M. F. in the motor coils, this will allow more current to flow in the A. C. power circuit from reactor 112 to the driving coil 24. This immediately increases the current flow in the D. C. input circuit from generator 96, to increase the magnetism in the iron core 126 of reactor 112 to saturate it to a greater degree, thus lowering the impedance of coil 120 to allow more A. C. current to go to the driving coil 24, thereby maintaining the amplitude substantially constant.

When the load on the reciprocating motor part decreases the back E. M. F. of the driving coil increases and less current is drawn through coil 110, therefore the impedance of coil 120 is increased, so that less current will flow to the driving coil 24, and the amplitude of reciprocation will remain at the predetermined level.

With good voltage regulation means for the input D. C. power supply it would be possible in some instances to eliminate coil 110 in the reactor, since the current flow to the driving coil 24 will automatically tend to vary with the load on the reciprocating member due to changes in its back E. M. F.

The amplifier power supply is through conductor 130 which joins wire 114 to generator 96 then through generator wires 102 and 132 to the amplifier. One pole of electro-magnetic coil 18 is joined by wire 134 to one side of generator 96 while the other pole thereof is connected by wire 136 to wire 114 leading to the other side of the generator. A variable resistance 138 is positioned in line wire 134 to regulate the flow of current to the magnetic field coil.

The cathode heaters 131 are connected in multiple by wires 133 and 135 with generator 96.

When it is desired to cut out the automatic impedance control, switch 124 is opened and switch 125 in shunt connecting line wire 127, is closed connecting line wires 118 with wire 122 through the variable resistance 129. This variable resistance might also be used in cooperation with the reactor 112, for obtaining a fine current control.

Referring now to the modified form of motor shown in Fig. 3 wherein the mechanical structure of the motor is substantially as shown in Fig. 1 and the power of the audio frequency amplifier is sufficient to meet the overload demands of the reciprocating member of the motor. The rectifier for the plate circuit of this amplifier is shown at 248 and includes transformer 250 and thermionic full wave tube rectifier 252. Power input to the rectifier is to coil 254 of the transformer. The direct current coil 256 of reactor 258 is in series with the rectifier and amplifier plate circuit. Alternating current coil 260 of the reactor is in series with the output of the amplifier and is in the power circuit supplying current to the driving coil 24 of the motor.

For normal operation the impedance coil 260 is manually adjusted so that impedance of the power circuit is slightly higher than the output of the amplifier. The D. C. coil 256 in reactor 258 is set so that it has slight effect on impedance of coil 260 at normal loads.

Since the output voltage of the amplifier will drop under heavy loads it might be difficult to match the impedance of the power circuit to coil 24 even though its impedance will drop due to a falling of E. M. F. in the motor coil of the reciprocating member.

When a sudden load is applied, the driving circuit to coil 24 tends to draw more current thereby increasing the D. C. plate current flow from the rectifier through the coil 256.

This increase in magnetic flux saturates the iron core of the reactor thereby cancelling the impedance effect of the A. C. coil 260, thus decreasing the impedance of the power circuit to driving coil 24. When the load lessens the value of the D. C. current through coil 256 will also decrease thereby raising the impedance of the A. C. coil 260 of reactor 258. Current is supplied to the electro-magnetic coil 18 from generator 262 through wires 264 and 266 through variable resistance 268.

This type of reciprocating motor is more especially suited for light work, furthermore any other source of D. C. current of sufficient voltage might be substituted for the rectifier shown.

Figure 4:
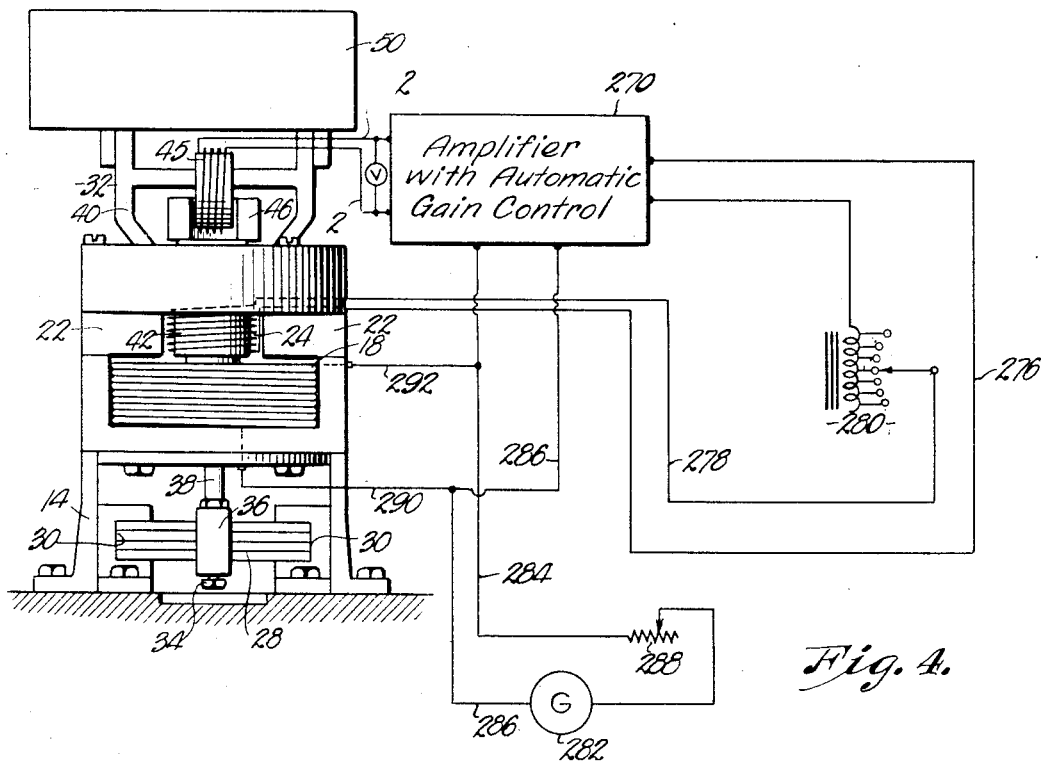
Fig. 4 is a diagrammatic view of the device wherein the audio frequency amplifier is used for power.

Another modified form is shown in Fig. 4 wherein the audio frequency amplifier is used for power and the mechanical structure is substantially the same as that shown in Fig. 1. The amplifier 270 is a standard audio frequency amplifier with automatic gain control and is supplied with input current from generator coil 45 through wires 272 and 274. The output of the amplifier is fed directly to the armature driving coil 24 through wires 276 and 278. A tapped impedance 280 in line wire 278 is manually controlled.

In this type of motor the amplifier power output must be sufficient to supply the necessary current demands at all loads. Since a perfect impedance match between the amplifier 270 and driving coil 24 would tend to draw full power from the amplifier at all times the tapped impedance 280 is set to keep its impedance slightly higher under normal loads.

The amplitude control of the reciprocating motor parts is maintained in the following manner:

Tapped impedance 280 is set to the desired amplitude with the amplifier operating below its rated capacity. If the load increases on the vibratory motor member impedance in circuit to coil 24 will drop due to decreased back E. M. F. in coil 24. More current will then flow from the amplifier, and at the same time this increased load will cause a decrease in the voltage of generator coil 45. Since the automatic gain control keeps the output of amplifier at constant level the falling off of the input voltage will not affect the output of the amplifier. Should the load on the vibratory member decrease, the impedance of power circuit to the driving coil 24 rises and the reverse action takes place.

The power input to amplifier 270 is from a suitable power source 282 through wires 284 and 286. This current is controlled by a variable resistance 288 in line wire 284. Generator 282 also furnishes power to the field coil 18 of the electromagnet through wires 290 and 292 which are respectively joined with wires 286 and 284.

The modified form shown in Fig. 5 contemplates the use of an electro-magnetic driving means and resilient means having a pre-determined frequency of vibration adapted to vibrate a variable mass including an electric generator which provides the input control current to an amplifier which is in circuit with the coils of the electro-magnetic means.

The base 300 is of rigid structure to carry the pedestal 302 having notches 304 to receive the end portions of laminated springs 306 to allow free vibratory movement of the spring or vibratory member. Secured for vibration with member 306 by clamp member 308 is a vertically disposed armature rod 310 which carries an armature 312 in operative relation with the stationary magnetic field member 314 having a core 316 and reverse pole windings 318 and 320. This field member is supported by bracket 320, which is carried by pedestal 302. Armature rod 310 passes through a guide plate 324 secured to bracket 320 and is provided at its upper end with a yoke 326 carrying a generator coil 328 which is positioned in the magnetic field of a magnet 330 carried by bracket 320. Mounted for reciprocation with yoke 326 is a suitable separating device adapted to receive materials in various quantities whereby the resultant mass to be vibrated is varied.

Current generated in coil 328 as the armature is vibrated passes by wires 332 and 334 to serve as the input to the audio frequency amplifier with automatic gain control 336. The power supply for this amplifier is through wires 338 and 340. The output from the rectifier is in series with the coils 318 and 320 of the electro-magnetic driving means through wire 342, half wave rectifier 344, wire 346, coils 318 and 320, wire 348, variable impedance 350 and wire 352. The half wave rectifier 344 delivers a unidirectional current to the coils 318 and 320, and the variable impedance 344 serves as an amplitude control. The amplifier is adjusted to give an output wave form with a flat top.

Where the reciprocated load or mass is increased and a drop in amplitude results the air gap at 354 will be increased causing impedance of the electro-magnetic drive circuit to drop thus allowing more current to flow from the output of the amplifier through choke coil 350. This action will tend to maintain a substantially even amplitude of vibration for the variable mass. Mercury vapor triode tubes might also be used in this circuit, with the half wave rectifier or in some instances the half wave rectifier might be eliminated.

Having thus described the invention, what is claimed as new and desired to be secured by Letters Patent is:

1. In an electric reciprocating motor, an element of variable mass to be reciprocated; a mechanical vibratory member to which said element is connected for audio frequency to and fro movement therewith; and electro-reactive means operable in conjunction with said vibratory member to effect movement of substantially constant amplitude to said element; and to maintain the electro-reactive means in synchronism with the reciprocation of said vibratory member.

2. An electric reciprocating motor comprising an armature of variable mass to be reciprocated; an electro-reactive means to impart to and fro movement to said armature; an electric generator associated with said armature and adapted to generate an electric current as the armature is reciprocated; a vibratory element mounted to impart reciprocating movement to said armature; and an electric circuit including said electro-reactive means and electric generator having means to automatically control an electric power feed current to said electro-reactive driving means whereby the amplitude of reciprocation of said armature is maintained substantially constant.

3. An electric reciprocating motor comprising an armature to be reciprocated; an electro-reactive means to impart high frequency to and fro movement of said armature; an electric generator associated with said armature and adapted to generate an electric current as the armature is reciprocated; a vibratory element mounted to impart reciprocating movement to said armature; and an electric circuit including electronic tubes, controlled by said generator current to regulate the flow of current from an electric power feed source to said electro-reactive driving means whereby the amplitude of vibration of said armature is maintained constant.

4. An electric reciprocating motor comprising an armature of variable mass to be reciprocated; an electro-reactive means to impart to and fro movement of audio frequency to said armature; an electric generator interconnected with said armature and adapted to generate an electric current as the armature is reciprocated; a vibratory element mounted to impart reciprocating movement to said armature; and an electric circuit including electronic tubes, controlled by said generator current to regulate the flow of current from an electric power feed source to said electro-reactive driving means whereby the amplitude of vibration of said armature is maintained constant as said armature mass is varied.

5. An electric reciprocating motor comprising a mass to be vibrated; fixed supporting means; a vibratory element carrying said mass and anchored to said supporting means effective to impart a vibratory movement to said mass; an electric generator comprising a moving element, reciprocated by said vibratory element relative to a stationary element whereby an electric current is produced; a driving armature carried by said mass in a magnetic field; and an electric circuit associated with said generator and armature having means to automatically control the electric current flowing to said armature whereby the frequency of said current is in synchronism with the vibratory movement of said mass at all times.

6. An electric reciprocating motor comprising a mass to be vibrated; fixed supporting means; a vibratory element carrying said mass and anchored to said supporting means to impart a vibratory movement to said mass; an electric generator comprising a moving element reciprocated by said vibratory element relative to a stationary element whereby an electric current is produced; a driving armature carried by said mass in a magnetic field; and an electric circuit including said generator and driving armature, having means to automatically control an electric power feed current to said driving armature whereby the driving armature current and the mass reciprocatory movement are maintained in constant synchronous relation.

7. An electric reciprocating motor comprising a mass to be vibrated; supporting means; a vibratory element carrying said mass and anchored to said supporting means to impart a vibratory movement to said mass; an electric generator comprising a moving element reciprocated by said vibratory element relative to a stationary element whereby an electric current is produced; a driving armature carried by said mass in a magnetic field; and an electric circuit including said generator and driving armature, having means to automatically control an electric power feed current to said driving armature whereby the flow of current from the power feed fluctuates with the change of mass to be vibrated to maintain a vibration of substantially uniform amplitude.

8. An electric reciprocating motor comprising an armature of variable mass to be vibrated; supporting means; a vibratory element of predetermined frequency of vibration carrying said armature mass and anchored to said supporting means to impart a vibratory movement to said mass; an electric generator operable by said vibratory element whereby an electric current is produced; a driving armature carried by said mass in a magnetic field; and an electric circuit including said generator and driving armature, having means to automatically control an electric power feed current to said driving armature whereby the driving armature current and the mass reciprocatory movement are maintained in synchronous relation as the armature mass varies.

9. An electric reciprocating motor comprising a mass to be vibrated; supporting means; a vibratory element carrying said mass and anchored to said supporting means capable of imparting to said mass a vibratory movement of pre-determined amplitude; an electric generator comprising a moving element reciprocated by said vibratory element and an element carried by said supporting means; a driving electric coil carried by said mass in a magnetic field; and means interposed in an electric circuit including said generator and said driving coil whereby a power supply current to said driving coil is controlled to maintain the frequency of said driving coil current in constant synchronism with the vibratory movement of said mass.

10. An electric reciprocating motor comprising an armature of variable mass to be reciprocated; a mechanical vibratory element of predetermined frequency interconnected with said armature to impart audio frequency vibratory movement thereto; an electric generator comprising parts relatively movable by said armature whereby an electric current is produced; an electric driving armature carried by said first named armature in a magnetic field; an inverted converter; an audio frequency amplifier receiving output current from said generator whereby to control the output of said current to said driving armature from said inverted converter; and means responsive to the varying mass of said armature whereby the current from said converter to said driving armature is varied to maintain a reciprocation of said armature of variable mass at uniform amplitude.

WILLIAM DUNCAN SWALLOW.